Feb. 15, 1944. C. E. JOHNSON ET AL 2,341,786
OPEN TYPE VARIABLE-SPEED TRANSMISSION
Filed March 3, 1941 2 Sheets-Sheet 1
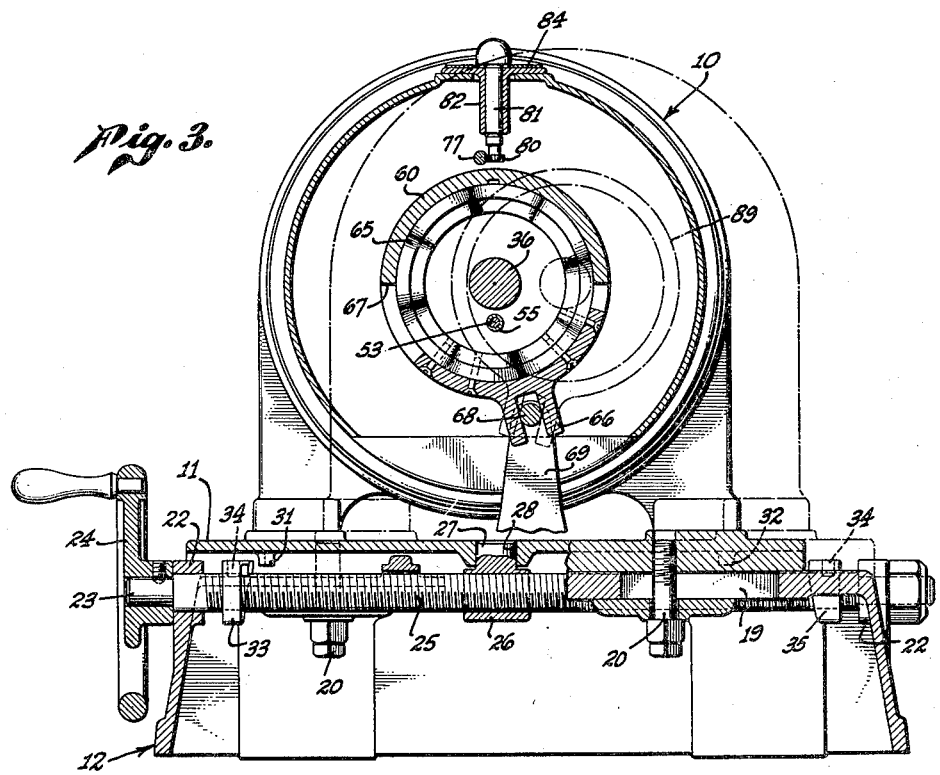
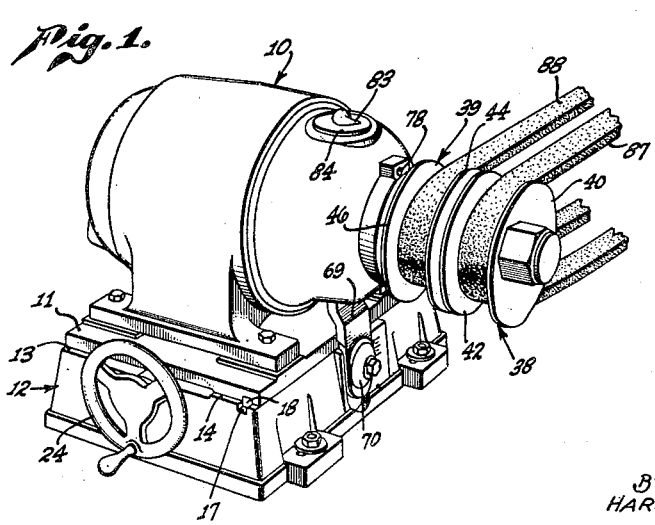
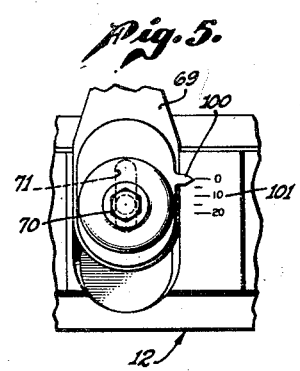
INVENTORS
CARL E. JOHNSON
EARL MENDENHALL
BY
HARRIS, KIECH, FOSTER & HARRIS
ATTORNEYS Feb. 15, 1944.  C. E. JOHNSON ET AL  2,341,786
OPEN TYPE VARIABLE-SPEED TRANSMISSION
Filed March 3, 1941  2 Sheets-Sheet 2

INVENTORS
CARL E. JOHNSON
EARL MENDENHALL
BY
HARRIS, KIECH, FOSTER & HARRIS
FOR THE FIRM
ATTORNEYS

Patented Feb. 15, 1944

2,341,786

UNITED STATES PATENT OFFICE

2,341,786

OPEN TYPE VARIABLE-SPEED TRANSMISSION

Carl E. Johnson, San Marino, and Earl Mendenhall, San Gabriel, Calif., assignors to Sterling Electric Motors, Inc., Los Angeles, Calif., a corporation of California Application March 3, 1941, Serial No. 381,426

17 Claims. (Cl. 74—230.17)

Our invention relates to the variable-speed transmission art, and more particularly to a V-belt variable-speed transmission.

A primary object of our invention is to provide a variable-speed transmission device of the V-belt type having an adjustable-diameter pulley including a pair of pulley flanges adapted to be positively axially moved relative to each other to vary the effective pulley diameter, the pulley structure being adapted to be moved in a direction perpendicular to the axis of the pulley flanges to adjust belt tension, and the device being provided with connecting mechanism between the pulley flanges and a base member whereby movement of the pulley unit to adjust belt tension simultaneously and positively moves both pulley flanges axially to adjust the effective diameter of the pulley. This construction obviates the necessity of having the pulley unit move at an angle relative to the belt when the belt is tightened, which is necessary in prior art devices in which only one flange of the variable-diameter pulley is moved axially relative to the other flange which is in fixed position.

Where a fixed-diameter pulley is used in conjunction with a variable-diameter pulley, it is well known that a change in the effective diameter of the variable-diameter pulley will require a change in the center distance between the axes of the pulleys where a contant length belt is employed, to maintain working tension in the belt. The usual provisions in the art for maintaining belt tension in such a system are either: (a) to provide a spring-held base for one of the pulleys and a positive adjustment mechanism for the variable-diameter pulley, so that the spring will permit movement of the movable pulley to permit the required changes in center distance caused by adjustment of the adjustable pulley, thus maintaining tension in the connecting belt; or (b) to provide mechanism for positively moving one of the pulleys to change the center distance between the pulleys and providing a variable-diameter pulley having one flange resiliently held in engagement with a cooperating flange by a spring, so as to permit the increased tension in the belt caused by a positive change in center distance between the pulleys to spread the flanges apart to decrease the effective diameter of the variable-diameter pulley. Such pulley systems, using either a spring-held pulley base or a variable-diameter pulley of the spring type, have not been generally satisfactory, as sudden changes in the load on the system cause the springs to surge and seize, and they also have other disadvantages.

It has been proposed to remedy the difficulties inherent in such pulley systems incorporating either spring bases or spring pulleys, as described in the preceding paragraph, by providing a pulley system including a fixed-diameter pulley, a variable-diameter pulley, means for positively adjusting the center distance between the pulleys when the effective diameter of the variable-diameter pulley is simultaneously adjusted, and means for positively adjusting the effective diameter of the variable-diameter pulley. Such proposed systems are ordinarily provided with a single control mechanism whereby the center distance between the pulleys and the effective diameter of the variable-diameter pulley may be simultaneously changed. In such devices the rate of change of the center distance between the pulleys and the rate of adjustment of the effective diameter of the variable-diameter pulley are each constant. However, the theoretically correct ratio between these rates of change does not remain constant, as is well known in the art, and if no compensation is provided for this change in ratio between the rates of change during adjustment, the tension of the belt will be substantially altered. The prior art devices do not maintain this theoretically correct ratio between the rates of change, which entails serious disadvantage, because if the belt is at correct tension when the variable-diameter pulley is adjusted to maximum or minimum diameter it will materially increase or decrease in tension during adjustment. The amount of such increase or decrease in belt tension is dependent, of course, in any given system upon the diameters of the two pulleys, the center distance between them, and the change in effective diameter of the variable-diameter pulley.

To attempt to remedy the foregoing difficulty within practical limits, it is common to provide in such a device means for varying the center distance between the pulleys at a different rate from the rate of change of effective diameter of the variable-diameter pulley. Even in such case, however, there is a marked change in belt tension during adjustment of the speed ratio between the pulleys, and, although it is not serious enough to make such an expedient entirely impractical, it is a structural compromise and results in loss of efficiency and increased wear on the belt due to changes in tension therein.

It has long been known in the art that theoretically the rate of change of the center distance between pulleys should be varied relative to the rate of change of effective diameter of the variable-diameter pulley, or vice versa, during adjustment of the system, but no practical device has been developed to accomplish this result to maintain uniform belt tension during adjustment. It is therefore a further important object of our invention to provide such a pulley system in which the rate of change of the effective pulley diameter of the variable-diameter pulley is varied relative to the rate of change of center distance between the pulleys.

A further object of our invention is to provide a pulley system such as is described in the preceding paragraph, in which the variation in the rate of change of the effective diameter of the variable-diameter pulley may be readily controlled as desired to permit the substitution of fixed-diameter pulleys of different diameters in the system.

A further object of our invention is to provide an apparatus for accomplishing the foregoing objects which is economical to manufacture and simple to operate. We prefer to accomplish this by providing an adjustment means for the variable-diameter pulley, which includes a rotatable cam mechanism adapted when rotated to change the effective diameter of the variable-diameter pulley, and means for rotating the cam mechanism at a controlled variable rate during adjustment of the center distance between the pulleys.

It will be appreciated that although the foregoing objects and their means of accomplishment are described as relating particularly to a pulley system in which there are a fixed-diameter pulley and a variable-diameter pulley and means for changing the center distance therebetween, we do not intend to be limited thereto but desire to include any pulley system in which the problem of variations in belt tension occurs during adjustment of the effective diameter of a variable-diameter pulley. For example, the same problem occurs in pulley systems in which the center distance between the pulleys and the belt length is fixed but both pulleys are of the adjustable-diameter type, because in such systems it is ordinary practice to adjust the diameters of the pulleys inversely at different rates in an attempt to maintain a reasonably uniform belt tension during pulley adjustment. By applying our invention to such systems, a substantially constant belt tension may be maintained during the adjustment of the speed ratio between the pulleys from maximum to minimum, and vice versa, as will be readily apparent to those skilled in the art.

Another, but related, problem occurs in pulley systems utilizing a fixed-diameter pulley and a variable-diameter pulley, where the center line between the axes of the pulleys is at an angle with the plane of movement of the axis of the pulley which is moved to vary the center distance therebetween. In such cases the rate of adjustment of the effective diameter of the variable-diameter pulley must be varied relative to the rate of adjustment of the center distance therebetween, the amount of such variation depending upon the angle which the center line through the pulley axes makes with the plane of movement of the axis of the movable pulley. This problem is pointed out and illustrated in the patent to P. B. Reeves, No. 1,941,417, issued December 26, 1933, to which reference is hereby made. As will be appreciated, the greater the angle that the center line through the pulley axes makes with the plane of movement of the axis of the movable pulley, the slower the rate of adjustment of the effective diameter of the variable-diameter pulley which will be required for the same rate of movement of the movable pulley. For example, if the axis of the fixed pulley lies in the plane of movement of the axis of the movable pulley, the axis of the movable pulley will have to move a particular distance in such plane during the adjustment of the adjustable-diameter pulley from maximum to minimum effective diameter. If, however, the plane of movement of the axis of the movable pulley is at an angle with the center line between the pulley axes, the movable pulley will have to move a greater distance while the variable-diameter pulley is being adjusted from maximum to minimum effective diameter than in the first instance. It is therefore a further important object of our invention to provide such a pulley system in which the ratio between the rate of adjustment of the effective diameter of the variable-diameter pulley and the rate of movement of the axis of the movable pulley may be varied to compensate for variations in the angle which the center line through the pulley axes makes with the plane of movement of the axis of the movable pulley. We prefer to accomplish this by varying the rate of adjustment of the effective diameter of the variable-diameter pulley relative to the rate of movement of the movable pulley, although we do not desire to be limited to such preferred embodiment.

It is a further object of our invention to provide a pulley device for use in such system as is described in the preceding paragraph in which indicating means are provided to indicate the proper adjustment of the device for any given angle that the center line through the pulley axes makes with the intended plane of movement of the axis of the movable pulley.

Another object of our invention is to provide a structure capable of accomplishing the foregoing objects which is economical to construct and simple in its construction and operation.

Further objects and advantages of our invention will be evident from the specification and the drawings, which are for the purpose of illustration only, and in which:

Fig. 1 is a perspective view of our invention.

Fig. 3 is a sectional view taken on the line 3—3 of Fig. 2.

Fig. 5 is a fragmentary elevational view showing an adjustment indicating means of our invention, taken generally on the line 5—5 of Fig. 2.

Figure 2:
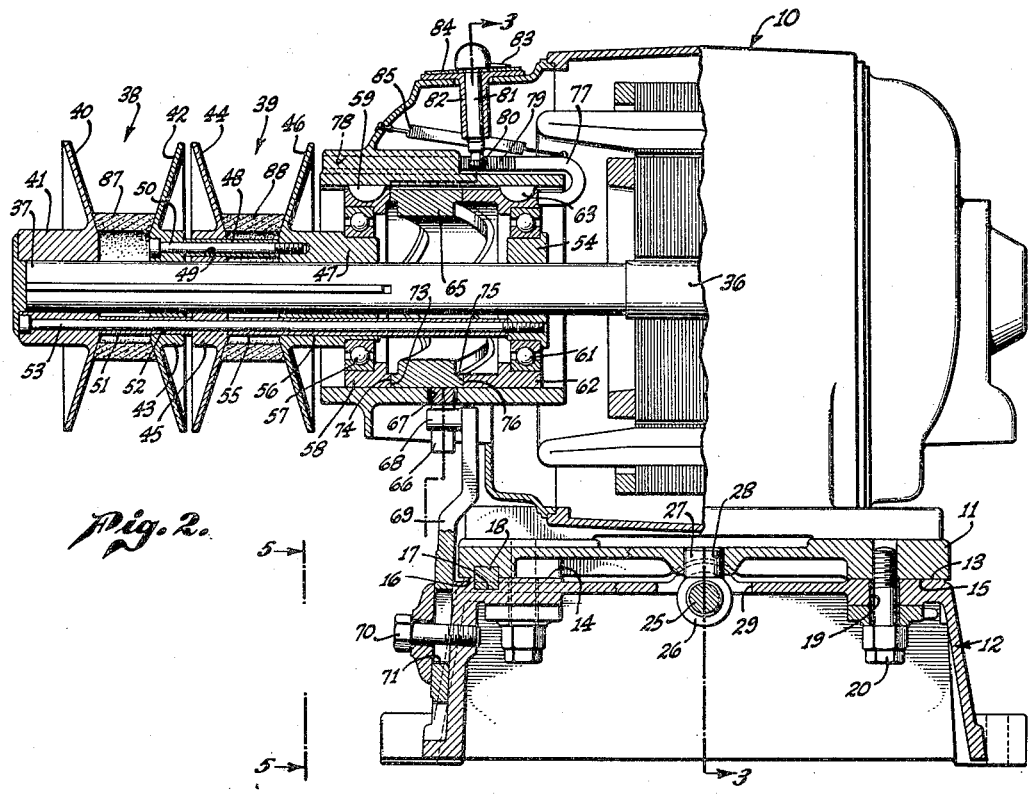
Fig. 2 is an elevational view, partly in section, of the device shown in Fig. 1, but showing a different position of adjustment.

Referring to the drawings, we show an electric motor 10 rigidly bolted to a motor platform 11 which in turn is supported on a hollow base 12 which may be suitably secured in fixed position on a floor or other supporting structure. The top of the hollow base 12 is provided with longitudinal top faces 13 and 14 on which rest, respectively, bottom faces 15 and 16 formed on the under side of the motor platform 11. The top face 14 is provided with a rectangular slot 17 which extends the length of the top face 14 and which is adapted to receive a downwardly projecting square rod 18 rigidly secured in the bottom face 16 of the motor platform 11, constituting a guide means for guiding movement of the motor platform 11 on the hollow base 12. The top face 13 is provided with a vertical slot 19 which extends longitudinally therealong parallel to the rectangular slot 17 and which receives a bolt 20 which is threaded into the motor platform 11 so as to hold the motor platform and the hollow base together but to permit sliding movement of the motor platform on the base.

The hollow base 12 is provided at each of its ends with a boss 22 drilled to provide a bearing surface journaling a control rod 23, the outer end of which extends beyond the hollow base and is provided with an operating wheel 24 suitably fixed thereto and by which the control rod may be rotated. The control rod 23 is provided with threads 25 throughout the major portion of its length, as best shown in Fig. 3, on which is threaded a collar 26 having a short stem 27 projecting upwardly into an opening 28 drilled in the top of the motor platform 11. The stem 27 and the opening 28 are preferably both cylindrical in form so as to permit the collar 26 to rotate slightly relative to the motor platform 11. As will be noted from Fig. 2, a longitudinal slot 29 is formed in the top of the hollow base 12 to accommodate the control rod 23 and the collar 26, the slot and the control rod being substantially parallel with the rectangular slot 17. Formed on or otherwise secured to the under side of the motor platform 11 are stop lugs 31 and 32 which project downwardly into the path of stop collars 33 and 35 threaded onto each end of the control rod 23 and rigidly fixed thereto by setscrews 34 or other suitable device. As will be apparent, both of the stop collars 33 and 35 may be adjusted longitudinally on the control rod 23 by loosening the setscrews 34 and rotating the stop collars relative to the control rod, and constitute adjustable stops against which the lugs 31 and 32 engage to limit movement of the motor platform 11 relative to the hollow base 12, which is a feature of our invention.

The electric motor 10 is provided with a drive shaft 36 having an outer end 37 on which is supported a pair of variable-diameter V-type pulleys 38 and 39. The pulley 38 includes an outer pulley flange 40 having a hub 41 carried by the drive shaft 36 and an inner pulley flange 42 having a hub 43 carried on the drive shaft. Similarly, the pulley 39 includes an outer pulley flange 44 having a hub 45 and an inner pulley flange 46 having a hub 47, the hubs 45 and 47 being carried on the drive shaft 36. As will be noted, each of the hubs 41, 43, 45, and 47 is keyed to the drive shaft 36 so as to be movable axially thereon but so as to rotate with the drive shaft. The inner pulley flanges 42 and 46 are rigidly connected together by a spacer sleeve 48 passing through a suitable opening 49 in the outer flange 44 of the pulley 39 and a screw rod 50 extending through the sleeve 48 and being threaded into the hub 47 of the inner pulley flange 46. Similarly, the outer pulley flanges 40 and 44 are held in spaced relation by a spacer sleeve 51 extending through an opening 52 in the inner pulley flange 42 of the pulley 38, and are clamped together by a screw rod 53 which passes through each of the hubs 41, 43, 45, and 47 and is threaded into an inner collar 54 carried on the drive shaft 36, the outer pulley flange 44 of the pulley 39 being held in spaced relation from the inner collar 54 by a spacer sleeve 55 extending through an opening 56 in the hub 47.

Suitably fixed on the inner end of the hub 47 is the inner race of a ball bearing 57, the outer race of which is fixed to an outer cam ring 58 keyed by means of a key 59 in a cylindrical flange 60 formed on the housing of the electric motor 10. Similarly, the inner collar 54 has fixed thereto the inner race of a ball bearing 61, the outer race of which is fixed to an inner cam ring 62 which is keyed by means of a key 63 in the cylindrical flange 60. It will thus be appreciated that the inner and outer cam rings 58 and 62 are each permitted to move axially relative to the cylindrical flange 60 but are prevented from rotating relative thereto by the keys 59 and 63.

The inner and outer cam rings 62 and 58 engage, and are separated by, a central actuating cam ring 65 which is not keyed to the cylindrical flange 60 and is therefore free to rotate relative thereto. Formed on the lower portion of the central cam ring 65 is a yoke 66 which projects downwardly through an arcuate slot 67 formed in the lower portion of the cylindrical flange 60. The yoke 66 spans a horizontal stub rod 68 formed on the upper end of a control plate 69 which is rigidly fixed to the side of the hollow base 12 by a suitable bolt 70 extending through a vertical slot 71 formed in the control plate.

Figure 4:
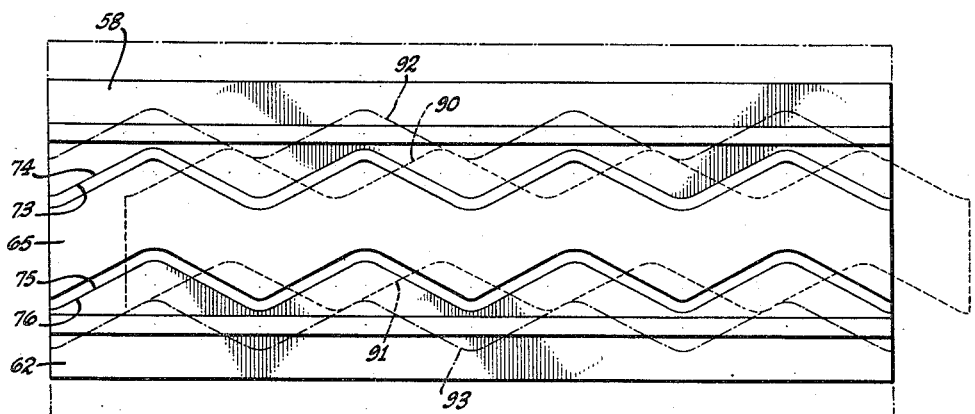
Fig. 4 is a plan development of the cam adjusting means of the invention.

As best shown in Fig. 4, the outer cam ring 58 is provided with an inner cam face 73 which mates with an outer cam face 74 formed on the actuating cam ring 65. Similarly, the inner cam ring 62 is provided with an outer cam face 75 which mates with an inner cam face 76 formed on the central cam ring 65.

A novel indicating means is included so as to indicate on the exterior of the housing of the electric motor 10 axial movement of the inner cam ring 62. This includes a J-shaped rod 77 which engages the inner end of the inner cam ring 62 and is slidably journaled in a suitable opening 78 provided in the cylindrical flange 60, the rod having formed thereon a rack 79 which is engaged by a pinion 80 mounted on the lower end of an indicator shaft 81 journaled in a sleeve 82 suitably secured to the housing of the electric motor, the upper end of the indicator shaft 81 being provided with a pointer 83 registering with a scale 84 suitably fixed on the outer end of the sleeve 82. A coil spring 85 is connected between the J-shaped rod 77 and the housing of the electric motor 10 so as to maintain the J-shaped rod in engagement with the inner end of the inner cam ring 62.

As will be noted, V-belts 87 and 88 engage the V-type pulleys 38 and 39, respectively, as is well known in the art, and are adapted to transmit power from the pulleys to a suitable driven pulley device (not shown).

In operation, rotation of the operating wheel 24 will rotate the control rod 23, which advances or returns the collar 26 thereon, thus moving the motor platform 11 and the electric motor 10 carried thereby in a direction generally parallel to the axis of the control rod 23 and determined by the rectangular slot 17 and the square rod 18 projecting thereinto, which comprises a guiding means of our invention. The stub rod 68 remains in one place due to the fact that the control plate 69 is rigidly fixed to the hollow base 12, and since the yoke 66 spans the stub rod, upon transverse movement of the electric motor 10 in response to operation of the operating wheel 24, the actuating cam ring 65 rotates on its axis as the electric motor is moved. With the actuating cam ring 65 in the position shown in full lines in the drawings, it will be noted that the pulley flanges of the pulleys 38 and 39 are in axial spaced relation so as to permit the belts 87 and 88 to ride inwardly therebetween, as best shown in Fig. 2, so as to provide the minimum effective diameters for the pulleys. The actuating cam ring 65 is permitted to rotate from the position shown in full lines in Fig. 3 to the position shown in dotted lines 89 thereof, and during this rotation of the actuating cam ring the outer cam ring 58 and the inner cam ring 62 are forced apart by the engagement of the outer cam face 74 and the inner cam face 76 of the actuating cam ring engaging the inner cam face 73 and the outer cam face 75 of the outer and inner cam rings, respectively. When the actuating cam ring 65 is rotated to the position shown by the dotted lines 89 of Fig. 3, the outer cam face thereof will occupy the position shown by dotted lines 90, and the inner cam face thereof will occupy the position shown by dotted lines 91 of Fig. 4, the outer cam ring 58 being moved outwardly to the position shown by dotted lines 92 and the inner cam ring 62 being moved inwardly to the position shown by dotted lines 93, all in Fig. 4. It will thus be appreciated that upon rotation of the actuating cam ring 65 the inner and outer cam rings 62 and 58 are spread apart, which movement thereof is communicated through the ball bearing 61, which also acts as a thrust bearing, to the outer pulley flanges of both of the pulleys 38 and 39, and through the ball bearing 57, which also acts as a thrust bearing, to both of the inner pulley flanges of the pulleys. Thus, upon such actuation, the inner and outer pulley flanges of each of the pulleys are moved together to force radially outwardly therebetween the belts 87 and 88 to increase the effective diameter of the pulleys. It will also be appreciated that as the effective diameters of the pulleys 38 and 39 are so increased, the pulleys are moved, through movement of the electric motor 10, toward the device to be driven.

Upon a reverse movement of the operating wheel 24, and consequently of the electric motor 10, the actuating cam ring 65 is rotated in a reverse direction so as to permit the outer and inner cam rings 58 and 62 to move together, which is accomplished by the increased tension in the belts 87 and 88 tending to force the inner and outer flanges of each of the pulleys 38 and 39 apart, as will be understood by those skilled in the art. Axial movement of the inner cam ring 62 will produce a corresponding axial movement of the J-shaped rod 77, which is transmitted through the rack 79 and pinion 80 to the indicating shaft 81, thus causing the pointer 83 to rotate relative to its scale 84 so as to indicate to an operator the transmission ratio for which the pulleys 38 and 39 are adjusted at any particular point during such movement of the inner cam ring.

As will be noted from Fig. 3, when the actuating cam ring 65 is in the position shown in full lines, the pulleys 38 and 39 are adjusted to their minimum effective diameter, and in this position the actuating cam ring and the yoke 66 are rotated to a position such that the stub rod 68 is at its farthest distance from the axis of the actuating cam ring, which may be referred to as the maximum extreme position thereof. Similarly, when the actuating cam ring 65 is in the position shown in dotted lines 89 in Fig. 3, in which the pulleys 38 and 39 are adjusted to their maximum effective diameter, the stub rod is also at its maximum distance from the axis of the actuating cam ring, which may be referred to as the minimum extreme position thereof. As the cam ring is rotated on its axis, by movement of the motor 10, from its maximum extreme position to its minimum extreme position, or vice versa, it will be noted that the yoke 66 first approaches a vertical position and then passes over the vertical position and moves to the other extreme position thereof. During this rotation of the yoke 66 about the axis of the actuating cam ring 65, the point of engagement between the yoke and the stub rod 68 moves radially toward the axis of the actuating cam ring until the yoke is in its vertical position, and then moves radially away from the axis of the actuating cam ring until the yoke reaches its other extreme position of rotation. The distance of the point of engagement between the yoke 66 and the stub rod 68 determines the rate of rotation of the actuating cam ring 65 relative to the rate of bodily movement of the motor 10, and because this point of engagement moves toward and away from the axis of the actuating cam ring during rotation of the cam ring from one extreme position to the other, the rate of rotation of the actuating cam ring as it moves between its extreme positions will be varied, even though the motor 10 moves at a uniform rate. Thus, as the actuating cam ring 65 rotates from one extreme position to the center position in which the yoke 66 is vertically disposed, the rate of rotation of the cam ring will increase, and then as the cam ring rotates from the center position to the other extreme position, the rate of rotation of the cam ring will decrease. Since rotational movement of the actuating cam ring 65 causes a corresponding change in pulley diameter of the pulleys 38 and 39, as described hereinabove, the rate of change of the effective diameters of the pulleys will not be uniform, but will vary in accordance with the rate of rotation of the actuating cam ring.

It will also be understood that the total change in effective diameter of the pulleys 38 and 39 will be, in most cases, greater or less than the linear change in center distance between the pulleys 38 and 39 and the driven pulleys to which they are connected, and that, consequently, the average rate of adjustment of the effective diameter of the pulleys 38 and 39 must be at a different rate than the rate of linear movement of the motor 10. As described early in this specification, this condition would normally cause the belts 87 and 88 to be at a different tension when the effective diameter of the pulleys is halfway between maximum and minimum than at either extreme position. Since it is desirable in most cases to design and adjust such a device so that the belts are at maximum tension in their extreme positions of adjustment on the pulleys 38 and 39, when the belts are in the halfway position of adjustment they would normally be at less tension, provided that the rate of change of the effective diameter of the pulleys 38 and 39 is uniform. However, by providing a variable rate of change of effective diameter of the pulleys 38 and 39, such as described hereinabove, the uniform tension of the belts is attained by our invention through all positions of adjustment of the effective diameter of the pulleys 38 and 39, which is an important feature of our invention.

Since the ratio between the rate of change of the effective diameter of the pulleys 38 and 39 and the rate of linear movement of the motor 10 is variable, and since the actual rates of change of each will depend in any given system on the diameters of the pulleys used, the variations in speed ratio desired between such pulleys, and the length of the belt to be used, our device must be adjusted when any one of these variables is changed. This adjustment to meet particular conditions of operation is provided in our device by the fact that the control plate 69 may be moved vertically, as described hereinafter, which will alter the rate of rotation of the actuating cam ring 65 to provide any desired ratio between the rate of change of effective diameter of the pulleys 38 and 39 and the rate of linear movement of the motor 10, and this adjustment feature is another feature of our invention.

When it is desired to change the rate of adjustment of the pulleys 38 and 39 relative to the rate of transverse movement of the electric motor 10, this may be accomplished by loosening the bolt 70 and adjusting vertically the position of the control plate 69 by raising or lowering the same, after which adjustment the bolt 70 is again tightened so as to hold the control plate rigid relative to the hollow housing 12.

As shown in Fig. 5, the control plate 69 is provided with a pointer 100 rigidly fixed thereto which registers with a scale 101 formed on or secured to the side of the hollow base 12 so that the pointer will register therewith. The parts of our device are designed so that for a particular installation the control plate 69 will be adjusted vertically to a position such that the pointer 100 will register with the 0° reading on the scale 101 when the center line through the axes of the pulleys 38 and 39 and the pulleys to be driven is horizontal. The scale 101 is so calibrated that the device may be readily used in installations where the center line through the axes of the pulleys 38 and 39 and the pulleys to be driven is inclined from the horizontal, so as to provide a positive adjustment feature by which the device may be readily adjusted to operate under such altered conditions of operation. If the center line is at an angle of 20° from the horizontal, for example, the control plate 69 is merely adjusted vertically, as described hereinabove, until the pointer registers with the 20° reading on the scale 101. This automatically provides the correct ratio between the rate of change of the effective diameter of the pulleys 38 and 39 and the rate of linear movement of the motor 10 in a horizontal direction for the 20° angle of the center line through the axes of the drive and the driven pulleys. Similar adjustments may be made to accommodate the device for installations where the angle of the center line through the drive and driven pulley axes is other than 20° within the limits of the device, as will be readily understood by those skilled in the art. This construction provides simple and positive means for solving the problem discussed hereinabove which is illustrated in the above-identified Reeves patent.

Although we have shown and described a preferred embodiment of our invention, it will be understood that certain parts thereof may be replaced by other parts performing the same function without departing from the spirit of our invention, and therefore we do not intend to be limited by the specific form described but desire to be afforded the full protection of the following claims.

We claim as our invention:

1. In a variable-speed transmission, the combination of: a variable-diameter pulley structure of the V-type adapted to receive a belt, said pulley structure including a variable-diameter pulley having a pair of pulley flanges each of which is axially movable relative to the other to vary the effective diameter of said pulley; control means for moving said pulley structure in a direction substantially perpendicular to the axis of said pulley; and adjustment means operating in response to actuation of said control means for moving both said pulley flanges axially relative to each other to vary the effective diameter of said pulley, said adjustment means including a first annular cam member connected to one of said pulley flanges and having a cam face, a second annular cam member connected to the other of said pulley flanges and having a cam surface, said cam members being axially aligned, and a movable actuating member engaging said cam face and said cam surface and operable to move said first and second members in opposite directions.

2. In a variable-speed transmission, the combination of: a variable-diameter pulley structure of the V-type adapted to receive a belt, said pulley structure including a variable-diameter pulley having a pair of pulley flanges each of which is axially movable relative to the other to vary the effective diameter of said pulley; supporting means for supporting said pulley structure for movement relative to said supporting means; control means for moving said pulley structure in a direction substantially perpendicular to the axis of said pulley; adjustment means operating in response to actuation of said control means for moving both said pulley flanges axially relative to each other to vary the effective diameter of said pulley, said adjustment means including an actuating cam member operatively connected to both of said pulley flanges whereby movement of said cam member causes movement of both said pulley flanges in opposite directions, and an operating member rigidly positioned relative to said supporting means for moving said cam member in response to said movement of said pulley structure; and adjustment means for adjusting the rate at which said operating member moves said cam member.

3. In a variable-speed transmission, the combination of: a variable-diameter pulley structure of the V-type adapted to receive a belt, said pulley structure including a variable-diameter pulley having a pair of pulley flanges each of which is axially movable relative to the other to vary the effective diameter of said pulley; supporting means for supporting said pulley structure for movement relative to said supporting means; means for moving said pulley structure in a direction substantially perpendicular to the axis of said pulley; and adjustment means operating in response to actuation of said control means for moving both said pulley flanges axially relative to each other to vary the effective diameter of said pulley, said adjustment means including a rotatable cam member operatively connected to both of said pulley flanges whereby rotation of said cam member causes movement of both said pulley flanges in opposite directions, and an operating member rigidly positioned relative to said supporting means and engaging said cam member and adapted to rotate said cam member in response to said movement of said pulley structure.

4. In a variable-speed transmission, the combination of: an electric motor having a housing and a drive shaft; a pulley of the variable-diameter V-type on said drive shaft having a pair of flanges one of which is axially movable relative to the other; a cylindrical flange associated with said housing and having a slot therein; adjustment means in said cylindrical flange adapted to move said movable pulley flange axially relative to the other pulley flange; and an actuating member operatively connected to said adjustment means and extending radially outwardly through said slot so that the outer end thereof may be rotated about the axis of said drive shaft to actuate said adjustment means.

5. In a variable-speed transmission, the combination of: an electric motor having a housing and a drive shaft; a pulley of the variable-diameter V-type on said drive shaft having a pair of flanges one of which is axially movable relative to the other; a cylindrical flange associated with said housing and having a slot therein; adjustment means in said cylindrical flange adapted to move said movable pulley flange axially relative to the other pulley flange; an actuating member operatively connected to said adjustment means and extending radially outwardly through said slot so that the outer end thereof may be rotated about the axis of said drive shaft to actuate said adjustment means; and means for rotating the outer end of said actuating member.

6. In a variable-speed transmission, the combination of: a variable-diameter pulley structure of the V-type adapted to receive a belt, said pulley structure including a variable-diameter pulley having a pair of pulley flanges one of which is axially movable relative to the other to vary the effective diameter of said pulley; adjustment means for axially moving said movable pulley flange relative to the other pulley flange; rack means operatively connected to said movable pulley flange and movable therewith; a pinion engaging said rack means and adapted to be rotated by movement of said rack means; scale means; and pointer means operatively connected to said pinion and adapted to cooperate with said scale means to indicate the axial adjustment of said movable flange.

7. In a variable-speed transmission, the combination of: a variable-diameter pulley structure of the V-type adapted to receive a belt, said pulley structure including a variable-diameter pulley having a pair of pulley flanges each of which is axially movable relative to the other to vary the effective diameter of said pulley, said pulley being supported on a shaft; a first annular cam ring concentric with but spaced from said shaft and operatively connected to one of said pulley flanges; a second annular cam ring concentric with but spaced from said shaft and operatively connected to the other of said pulley flanges; an actuating cam ring concentric with but spaced from said shaft and engaging both said first and second cam rings whereby rotation of said actuating cam ring moves said first and second cam rings and the pulley flanges connected thereto axially in opposite directions; and means for rotating said actuating cam ring.

8. In a variable-speed transmission, the combination of: a variable-diameter pulley structure of the V-type adapted to receive a belt, said pulley structure including a plurality of variable-diameter pulleys each having a pair of pulley flanges each of which is axially movable relative to the other flange of the same pulley to vary the effective diameter of said pulley, each of said pulleys being supported on a common shaft; a first annular cam ring concentric with but spaced from said shaft and operatively connected to one of said pulley flanges of all of said pulleys; a second annular cam ring concentric with but spaced from said shaft and operatively connected to the other of said pulley flanges of all of said pulleys; an actuating cam ring concentric with but spaced from said shaft and engaging both said first and second cam rings whereby rotation of said actuating cam ring moves said first and second cam rings and the pulley flanges connected thereto axially in opposite directions; and means for rotating said actuating cam ring.

9. In a variable-speed transmission, the combination of: a pulley structure adapted to receive a belt, said pulley structure including a variable-diameter pulley of the V-type having a pair of pulley flanges one of which is axially movable relative to the other to change the effective diameter of said pulley; and adjustment means connected to said pulley and adapted to move said movable flange axially to vary the effective diameter of said pulley, said adjustment means including a rotatable element operatively connected to said movable flange so that rotation of said element causes axial movement of said flange, operating means operatively connected to said rotatable element and adapted to rotate the same, the point of application of force exerted by said operating means on said rotatable element changing during rotation of said rotatable element.

10. In a variable-speed transmission, the combination of: a pulley structure adapted to receive a belt, said pulley structure including a variable-diameter pulley of the V-type having a pair of pulley flanges one of which is axially movable relative to the other to change the effective diameter of said pulley; and adjustment means connected to said pulley and adapted to move said movable flange axially to vary the effective diameter of said pully, said adjustment means including a movable element operatively connected to said movable flange so that movement of said element causes axial movement of said flange, operating means operatively connected to said movable element and adapted to move the same, the point of application of force exerted by said operating means on said movable element changing during movement of said movable element.

11. In a variable-speed transmission, the combination of: a pulley structure adapted to receive a belt, said pulley structure including a variable-diameter pulley of the V-type having a pair of pulley flanges one of which is axially movable relative to the other to change the effective diameter of said pulley; and adjustment means connected to said pulley and adapted to move said movable flange axially to vary the effective diameter of said pulley, said adjustment means including a rotatable element operatively connected to said movable flange so that rotation of said rotatable element causes axial movement of said movable flange, operating means for applying a force to said rotatable element to rotate the same, the point of application of said force on a radius of said rotatable element changing during rotation of said rotatable element.

12. In a variable-speed transmission, the combination of: a pulley structure of the variable-diameter V-type including a pulley having a pair of flanges one of which is axially movable relative to the other for varying the effective diameter of said pulley; adjustment means operatively connected to said pulley and adapted to move said movable flange axially to vary the effective diameter of said pulley, said adjustment means including a member rotatable through an arc about an axis; an actuating element engaging said member so as to apply a rotating force thereto upon relative movement between said pulley structure and said actuating element, the point of application of force by said actuating element to said member varying radially from said axis during such relative movement; and means for causing relative movement between said pulley structure and said actuating element.

13. In a variable-speed transmission, the combination of: a supporting structure; a pulley structure mounted on said supporting structure for movement thereon, said pulley structure including a variable-diameter pulley of the V-type having a pair of flanges one of which is axially movable relative to the other for varying the effective diameter of said pulley; adjustment means operatively connected to said pulley and adapted to move said movable flange axially, said adjustment means including a member rotatable through an arc about an axis; an actuating element associated with said supporting structure and engaging said member so as to apply a rotating force thereto upon movement of said pulley structure on said supporting structure, the point of application of force by said actuating element to said member varying radially from said axis during said movement of said pulley structure; and means for causing such movement of said pulley structure on said supporting structure.

14. In a variable-speed transmission, the combination of: a supporting base; a pulley structure supported for movement on said base, said pulley structure including a variable-diameter pulley of the V-type having a pair of flanges one of which is axially movable relative to the other to vary the effective diameter of said pulley; adjustment means operatively connected to said movable flange and adapted to move it axially, said adjustment means including a member rotatable through an arc about the axis of said pulley; an actuating element associated with said supporting structure and engaging said member so as to apply a rotating force thereto in response to movement of said pulley structure on said supporting structure; and means for causing such movement of said pulley structure on said supporting structure.

15. In a variable-speed transmission, the combination of: a supporting base; a pulley structure mounted for movement on said base, said pulley structure including a variable-diameter pulley of the V-type including a pair of flange members one of which is axially movable relative to the other to vary the effective diameter of said pulley; adjustment means operatively connected to said movable flange and operable to move said movable flange axially; an actuating element adjustably secured to said supporting structure and engaging said adjustment means whereby movement of said pulley structure on said base causes said actuating element to operate said adjusting means, the rate of operation of said adjustment means depending upon the set position of said actuating element relative to said base; means for moving said pulley structure on said base; and indicating means cooperating between said actuating element and said base and operable in response to changes in the set position of said actuating element relative to said base for indicating the rate of operation of said adjustment means.

16. In a variable-speed transmission, the combination of: a housing; a variable-diameter pulley of the V-type having a pair of flange members one of which is axially movable relative to the other to vary the effective diameter of said pulley; adjustment means in said housing and operatively connected to said movable flange and operable to move said movable flange axially; means for operating said adjustment means; rack means in said housing operatively connected to said movable flange and movable therewith; a pinion engaging said rack means and adapted to be rotated by movement of said rack means; a rod operatively connected to said pinion and rotatable therewith, said rod extending out of said housing; pointer means on the outer end of said rod on the outside of said housing; and scale means on the outside of said housing and adapted to cooperate with said pointer means to indicate the degree of axial adjustment of said movable flange.

17. In a variable-speed transmission, the combination of: a shaft; a pair of pulleys on said shaft, each of which is of the variable-diameter V-type having a pair of flanges one of which is axially movable relative to the other to vary the effective diameter of its pulley; means connecting said movable flanges rigidly together; a member axially aligned with said shaft and operatively connected to one of said movable flanges, said member having a cam face; a rotatable actuating cam axially aligned with said shaft and engaging said cam face; and means for rotating said actuating cam whereby said movable flanges are both moved axially to vary the effective diameters of said pulleys.

CARL E. JOHNSON.
EARL MENDENHALL.